United States Patent [19]
> Imamura

[11] Patent Number: 4,594,881
[45] Date of Patent: Jun. 17, 1986

[54] PRESSURE DETECTING APPARATUS
[75] Inventor: Takumi Imamura, Kasiwa, Japan
[73] Assignee: Nihon Kuatsu System Corp., Ltd., Japan
[21] Appl. No.: 686,845
[22] Filed: Dec. 27, 1984
[30] Foreign Application Priority Data
Aug. 9, 1984 [JP] Japan .............. 59-121458[U]
[51] Int. Cl.⁴ ............................................ G01B 13/12
[52] U.S. Cl. ........................................ 73/37.5; 73/727
[58] Field of Search ................ 73/37.5, 721, 727, 754

[56] References Cited
U.S. PATENT DOCUMENTS

| 2,707,389 | 5/1955 | Fortier | 73/37.5 |
| 3,477,276 | 11/1969 | Fortier | 73/37.5 |
| 3,490,058 | 1/1970 | Fortier | 73/37.5 |
| 3,863,493 | 2/1975 | Busenkell | 73/37.5 |
| 4,502,335 | 3/1985 | Wamstad et al. | 73/727 X |

FOREIGN PATENT DOCUMENTS
1282692 7/1972 United Kingdom ............... 73/37.5

Primary Examiner—Jerry W. Myracle
Assistant Examiner—Joseph W. Roskos
Attorney, Agent, or Firm—Willian Brinks Olds Hofer Gilson & Lione

[57] ABSTRACT

A pressure operated detecting apparatus for providing highly sensitive on-off and distance measuring signals. The apparatus comprises an air bridge circuit which includes a semiconductor chip utilizing the piezo-resistance effect. The chip is exposed at opposite sides to a reference air pressure and a subject air pressure which is variable in response to an approaching object. The chip produces an output voltage in response to the difference in pressure which is amplified and converted to an analog signal which is usable for distance measuring. The analog signal is also compared to a reference voltage in a comparator which generates an on-off binary signal.

4 Claims, 4 Drawing Figures

PRESSURE DETECTING APPARATUS

FIELD OF THE INVENTION

The present invention relates to pressure operated detecting apparatus, and more particularly to an improved apparatus for detecting the approach of an object and operable to provide highly sensitive on-off and distance measuring signals.

BACKGROUND OF THE INVENTION

Conveyors and other apparatus used in the automatic handling of objects have shown remarkable progress recently. In addition to various optical and electrical detecting devices, apparatus utilizing air nozzles to detect whether the object is in a predetermined position or whether the shape of the object is correct is widely employed because of its simplicity and safety. In devices which transport or feed objects using vacuum suction, it is common to detect whether the device is operating properly through detection of a change of vacuum in a conduit leading to the suction head.

Apparatus utilizing air pressure change detection methods have found only limited use. One reason is that the transmission speed of the detection signal and the precision of detection is less than that provided by electrical detecting devices, despite such advantages of air detection devices as immunity from interference by temperature, humidity, vibration and noise conditions, and safety in use near inflammable materials.

Among the known air pressure measuring and control devices are those utilizing an air bridge circuit which uses an air detection nozzle to measure changes in air pressure for detecting the presence of an object and/or measure the distance to an object. Such apparatus functions as a proximity switch and is capable of generating on on-off signal by detecting the presence or absence of an object without contact. This apparatus operates independently of the material of the object, provides stable detection as it is insensitive to changes in absolute pressure of the supplied air, and has a relatively high detection sensitivity.

However, such apparatus generally suffers the drawback of a relatively slow response speed as a result of using air pressure, particularly in detecting small pressure changes. For this reason, such apparatus is practical only in providing a signal for an on-off switching function.

SUMMARY OF THE INVENTION

The present invention provides an improved pressure operated detecting apparatus utilizing an air bridge circuit and which has a significantly improved response speed, can be readily installed even in a vibrating environment, and which is operable to provide a signal for measuring distance in addition to providing a signal for an on-off switching function.

The detecting apparatus of the present invention includes a pneumatic bridge circuit having a reference pressure path and a subject pressure path connecting an air supply inlet to the atmosphere and a detecting nozzle respectively. The reference pressure path includes a first orifice and a valve open to the atmosphere. The subject pressure path includes a second orifice and a connection for the detecting nozzle. The reference pressure path is connected to one side of a pressure detecting sensor by a reference pressure inlet which is between the first orifice and the valve, and the subject pressure path is connected to the other side of the pressure detecting sensor by a subject pressure inlet between the air supply inlet and the detecting nozzle. Pressurized air is supplied through the air supply inlet to the subject and reference paths and a pressure difference between the reference pressure inlet and the subject pressure inlet is detected by the pressure detecting sensor to generate an output signal corresponding to the pressure difference. The pressure detecting sensor includes a piezo-resistance pressure detecting element operable under constant current supply to generate a voltage output signal corresponding to the pressure difference which is delivered to an amplifying circuit for conversion into an analog signal. A comparator circuit compares the analog signal to a reference voltage to generate an on-off binary signal, and the binary signal is converted to a control output in an output circuit.

DETAILED DESCRIPTION OF THE INVENTION

Figure 1:
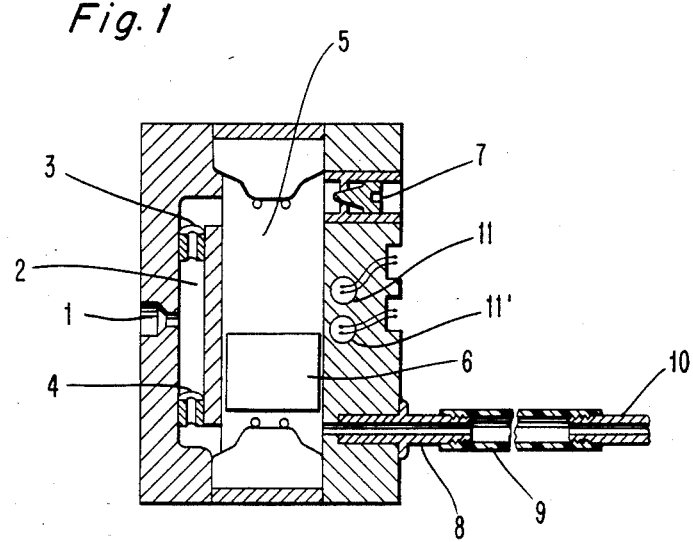
FIG. 1 is a sectional view showing the structure of a prior art pressure switch utilizing a conventional air bridge circuit.

Reference is now made in detail to the attached drawings wherein FIG. 1 shows the structure of a conventional pressure operated detecting switch utilizing an air bridge circuit. As shown there, a vertical air path 2 communicates an air supply inlet 1 with a first orifice 3 and with a second orifice 4. A detector chamber 5 is positioned adjacent path 2 and has an upper end communicated with the outlet of first orifice 3 and a lower end communicated with the outlet of the second orifice 4. The upper end of the detector chamber 5 communicates with a needle valve 7 which opens to the atmosphere. The lower end of the detector chamber 5 communicates with a nozzle connector 8 which, in turn, is connected to a detecting nozzle 10 through a conduit 9.

A float 6 formed as a piston is positioned in the chamber 5 and includes a permanent magnet. The piston 6 is moved upwardly in the chamber 5 when the pressure in the lower part of the chamber exceeds that in the upper part thereof. A pair of magnetically operable reed switches 11, 11' is provided in the wall of the chamber, and one of the switches shifts from an "on" state to an "off" state while the other shifts from "off" to "on" as the float 6 moves in one direction. The reverse is true when the float 6 moves in the other direction, as will be understood by those skilled in the art.

Thus, by gradually closing the needle valve 7 while pressurized air is supplied from the air supply inlet 1 with an object positioned close to the detecting nozzle 10, the pressure in the upper part of the detector chamber increases gradually causing float 6 to move downwardly in the chamber 5 and actuate the switches 11, 11' despite high pressure in the lower part of the detector chamber. The needle valve 7 can be gradually opened and stopped at a position where the reed switches are actuated again. Thereafter, the reed switches return to their original state or are shifted when the object moves further from or closer to the detecting nozzle 10.

In such apparatus, a float 6 with an area of 0.8 cm² and a weight of 3 g is actuated when the difference in pressure above and below the piston reaches approximately 50 mmAq, and the air flow from below to above between the float and the wall of the detector chamber is not negligible. A higher detecting sensitivity requires a smaller weight-to-cross section ratio of the float, but a significant improvement cannot be expected since a smaller weight leads to unstable operation while a larger cross-section leads to a slower response. A minimum pressure difference of 15 mmAq is required for elevating or lowering the float, and the float cannot effect a switch change faster than 0.06 seconds because of its inertia.

Figure 2:
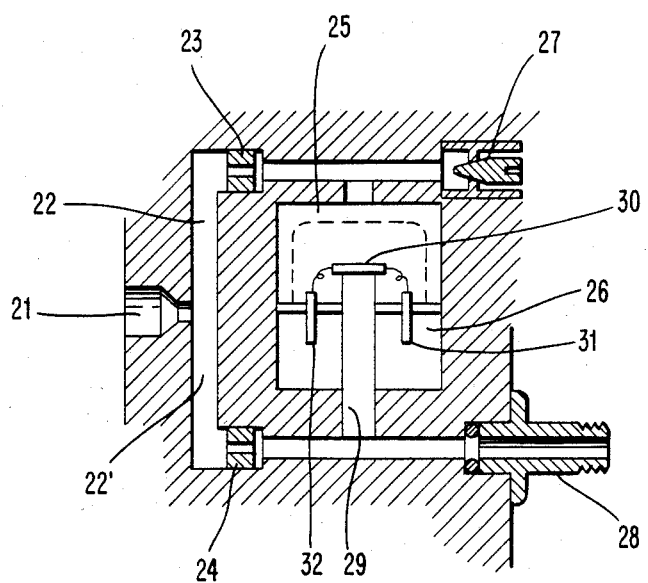
FIG. 2 is a schematic sectional view similar to FIG. 1 and showing an air bridge circuit constructed according to the present invention.

FIG. 2 shows the structure of the air pressure operated detecting apparatus of the present invention. First and second paths 22, 22' are connected to an air supply inlet 21 and to a first orifice 23 and a second orifice 24, respectively. The first orifice 23 leads to a needle valve 27 communicating with the atmosphere, and forms a reference path. A pressure sensor chamber 25 is connected to the reference path by a reference pressure inlet between the orifice 23 and the valve 27.

The second orifice 24 leads to a connector 28 which is adapted for connection to a detecting nozzle (not shown) and forms a subject path parallel to the reference path. The subject pressure path is connected to a subject pressure inlet 29 communicating with a pressure detecting sensor 26 provided in the pressure sensor chamber 25. The sensor 26 includes a semiconductor 30.

The air circuit of the present invention described above and shown in FIG. 2 is substantially the same, in principle, as the air bridge circuit described above and shown in FIG. 1. However, in the device of FIG. 2, the reference pressure between the first orifice 23 and the needle valve 27 is supplied directly to the pressure sensor chamber 25 and to one face of the semiconductor chip 30, while the subject pressure is supplied through the narrow subject pressure path 29 to the other face of the semiconductor chip 30. Air at the subject pressure side of the chip 30 is blocked by the chip from the reference pressure side. The volume of subject pressure path 29 is considerably less than the pressure sensor chamber 25 so that the change in pressure in the subject path produces a considerable change in pressure at the subject pressure side of the chip 30 compared to pressure changes at the reference pressure side produced by pressure changes in the reference path. Still further, there is no air leak past chip 30. All in all, the response speed of the circuit is significantly faster than in prior art devices.

Figure 3:
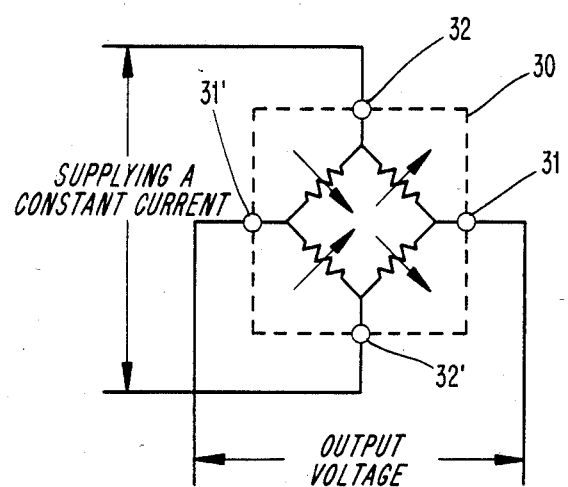
FIG. 3 is a schematic view of an equivalent electrical circuit to the pressure detecting sensor of this invention.
Figure 4:
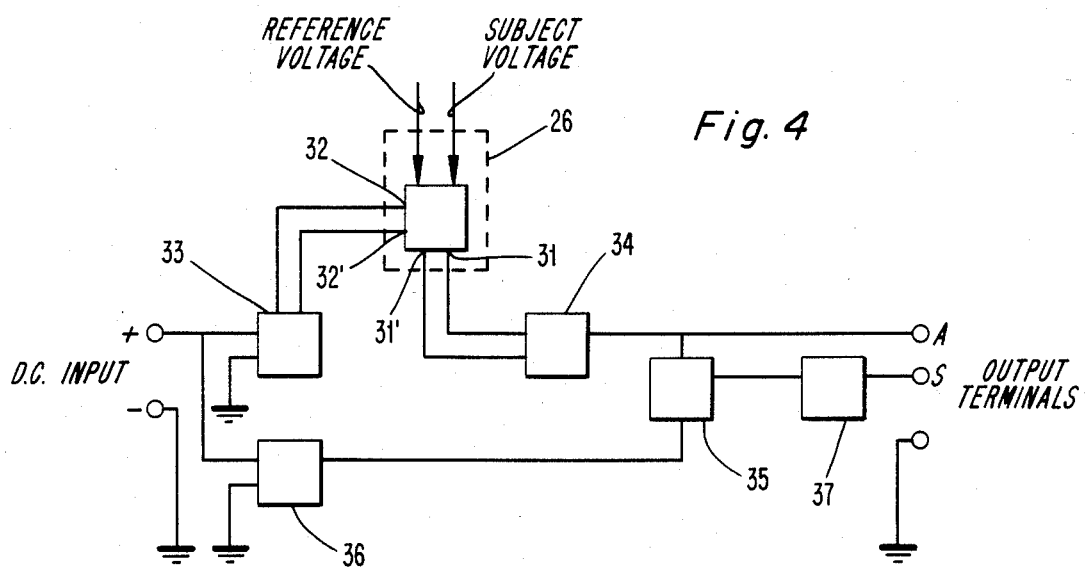
FIG. 4 is a schematic view of an electronic circuit used in this invention.

The pressure detecting sensor 26 in the present invention employs an element utilizing the piezo-resistance effect of a semiconductor, and is so constructed that the semiconductor chip 30 closes the subject pressure path 29. In addition, the semiconductor chip 30 constitutes a resistance bridge circuit. As shown in FIG. 3, the pressure detecting sensor 26, under the supply of a constant current, is exposed to the reference pressure and the subject pressure on opposite faces of the chip 30, and generates an output voltage at terminals 31, 31' corresponding to the difference between these pressures. In the present invention, the output voltage of the pressure detecting sensor 26 is amplified and converted into a control output in an electronic circuit shown in FIG. 4.

A constant current from a constant current circuit 33 is supplied at terminals 32, 32' of the semiconductor chip 30 in the pressure detecting sensor 26. The output of the semiconductor chip 30 corresponds to the potential difference between the terminals 31, 31' of the semiconductor chip 30. This output potential is amplified in an amplifying circuit 34 and appears as an analog voltage at an output terminal A and is used to provide a continuous distance measurement for objects approaching the nozzle at the subject pressure path. In addition, this analog voltage is compared in a comparator circuit 35 with a reference voltage determined in a reference voltage circuit 36 and is converted into a binary voltage signal in accordance with the comparison results. The binary signal is converted into an on-off output in an output circuit 37 for controlling a switch such as an external relay or a small capacity device and appears at a terminal S.

As explained in the foregoing, the pressure detecting apparatus of the present invention is capable of providing both an analog output and an on-off control output as it detects the change in the air pressure generated at a pressure detecting nozzle. The air bridge circuit of the inventive apparatus, which includes a pressure detecting sensor such as a semiconductor utilizing the piezo-resistance effect or the like, is highly sensitive and thereby improves the response speed and detecting sensitivity of the apparatus. This apparatus converts the detection output into an on-off signal by comparison with a reference voltage after amplification in an electronic circuit. Consequently it can not only achieve stable and precise detection of the pressure change regardless of a change in the pressure of the supplied operating air, but also it can significantly improve the response speed even for small pressure changes.

The present invention obviates the limitations in prior art devices relating to location of the apparatus. The invention also allows use with a wide range of inlet air pressures from increased pressure to vacuum, and with various modifications through the selection of the reference voltage in an electronic circuit and through adjustment of the needle valve in the air circuit.

Furthermore, in addition to the conventional on-off control function, the invention provides an analog output which provides a continuous distance measurement for approaching objects in the nature of an air micrometer.

In summary, the apparatus of this invention is far superior in performance, includes new functions, and is free from many limitations in use when compared with the conventional prior art apparatus. Further, the inventive apparatus is more compact and lighter in weight thereby significantly expanding the range of application of pneumatic control and measuring instruments.

I claim:

1. A pressure detecting apparatus comprising:
   (a) a pneumatic bridge circuit having a subject and a reference pressure path connecting an air supply inlet to the atmosphere and to a detecting nozzle, respectively, said reference pressure path including a first orifice and a valve opening to the atmosphere, said subject pressure path including a second orifice and means for connection to said detecting nozzle, said reference pressure path connected to a reference pressure inlet of a pressure detecting sensor between said first orifice and said valve, said subject pressure path connected to a subject pressure inlet of said pressure detecting sensor between said second orifice and said nozzle connection;

(b) said pressure detecting sensor including a piezo-resistance pressure detecting element operable to detect the pressure difference between said reference pressure inlet and said subject pressure inlet, said pressure detecting element operable under constant current supply to generate a voltage output signal corresponding to said pressure difference;

(c) an amplifier circuit for converting said voltage signal into an analog signal;

(d) a comparator circuit for comparing said analog signal with a reference voltage and operable to generate an on-off binary signal; and (e) an output circuit for converting said binary signal into a control output signal.

2. The apparatus claimed in claim 1, said pressure detecting element comprising a semiconductor chip.

3. The apparatus claimed in claim 1, including a pressure chamber connected to said reference pressure inlet, said pressure detecting element being disposed in said pressure chamber and having one side exposed to reference pressure in said chamber, the other side of said pressure detecting element being exposed to subject pressure, said subject pressure inlet having a substantially smaller volume than said pressure chamber.

4. The apparatus claimed in claim 1, said valve being manually adjustable and independent of said pressure detecting element.

* * * * *